318-717 SR

OR RE 25,893

Nov. 2, 1965 P. LAUPER Re. 25,893

AUTOMATIC MEANS FOR ROTATING A LAGGING OR LEADING ROTOR OF A SYNCHRONOUS MACHINE

Orig. 3165,687

Original Filed March 3, 1961 2 Sheets-Sheet 1

INVENTOR;

PAUL LAUPER

BY Frederick Reitenfeld

ATTORNEY

INVENTOR:

PAUL LAUPER

BY Frederick Breitenfeld
ATTORNEY

United States Patent Office

Re. 25,893
Reissued Nov. 2, 1965

25,893

AUTOMATIC MEANS FOR ROTATING A LAGGING OR LEADING ROTOR OF A SYNCHRONOUS MACHINE

Paul Lauper, Zurich, Switzerland, assignor to Oerlikon Engineering Company, Zurich, Switzerland, a corporation of Switzerland Original No. 3,165,687, dated Jan. 12, 1965, Ser. No. 93,155, Mar. 3, 1961. Application for reissue Apr. 28, 1965, Ser. No. 462,777

Claims priority, application Switzerland, Mar. 19, 1960, 3,106/60

4 Claims. (Cl. 318—167)

Matter enclosed in heavy brackets [ ] appears in the original patent but forms no part of this reissue specification; matter printed in italics indicates the additions made by reissue.

This invention relates to a circuit which senses the lagging or leading position of a rotor in a synchronous machine, whether a motor or a generator, and automatically generates a return force which returns the rotor to its proper position.

When a load is applied to a synchronous motor, its motor shaft is momentarily slowed down, but only for an instant since the average speed cannot decrease and the motor must operate at constant synchronous speed. The momentary reduction in speed results in an altered relative position of the fields and the armature poles. The back electromotive force is reduced and more power is extracted from the power feed conductors. This condition is normal with every synchronous motor. However, there are times when a suddenly applied load or a sudden change in the applied voltage causes the rotor to lag by a large amount and the synchronous operation of the motor is in danger. In such a condition the automatic means described herein causes a large rotor force to be generated and the rotor speed is maintained. There are times when the rotor may be displaced by 180 electrical degrees from its correct position.

In all cases involving an unusual leading or lagging rotor, a voltage regulating means is employed to operate on the exciting current and to exert a strong corrective force to rotate the field poles to their normal position. There are available several known structures which can be used for measuring the rotor angle with respect to the rotating field. One such structure includes an auxiliary generator mounted on the generator shaft. Another method includes the use of a stroboscopic measuring arrangement. All these methods require additional space on the generator shaft and they are costly and complicated.

The present invention is characterized by a relay arrangement actuated by a current which is proportional to the voltage applied to the synchronous machine and the direct current applied to the exciting winding of the machine. The relay is actuated when the direct current supplied to the rotor windings is reduced by a considerable amount and when a predetermined ratio between the stator voltage and the exciting current is exceeded. The relay arrangement does not revolve with the rotor shaft, it is small, easy to service, and has a long operating life.

One of the objects of this invention is to provide an improved control arrangement for synchronous machines which avoids one or more of the disadvantages and limitations of prior art arrangements.

Another object of the invention is to provide a current control means which returns a rotor of a synchronous machine to its proper position automatically.

Another object of the invention is to reduce the cost of synchronous control systems.

Still another object of the invention is to provide a control system which is mechanically detached from the rotating parts of the machine and which can be serviced and adjusted easily.

For a better understanding of the present invention, together with other and further objects thereof, reference is made to the following description taken in connection with the accompanying drawings.

Figure 1:
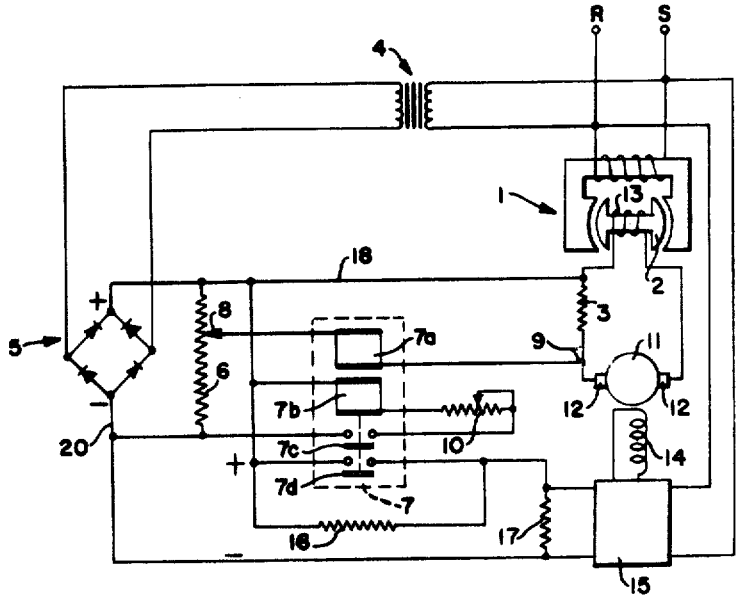
FIG. 1 is a schematic diagram of connections showing how the synchronous machine is controlled by a relay arrangement.

Referring now to FIG. 1, a schematic drawing of a synchronous motor 1 is shown having a rotor 2 excited by direct current and having an alternating current stator winding connected to two supply terminals R, S. Most of the synchronous motors in use today are either two or three phase and require at least one additional winding and at least one additional terminal. However, for the description and operation of the invention, a single phase supply is sufficient. Also, during the explanation of the operation, the machine 1 will be treated as a motor although the invention can be applied to control generators.

The power supply terminals are connected to a transformer 4 having its secondary winding connected to a bridge type rectifier 5. The resulting direct current is supplied to a potentiometer, or voltage divider 6, having a tap 8, which can be adjusted by manual operation. The direct current supply is connected to other parts of the control circuit which will be described later.

[The] *A polarized* relay 7, shown enclosed in dotted lines, includes an operating winding 7a, a holding winding 7b, a first pair of normally open contacts 7c, and a second pair of normally open contacts 7d. The operating winding is connected between tap 8 on potentiometer 6 and terminal 9 which is part of the direct current supply for the exciting field 2. A small resistor 3 is connected in series in the direct current supply circuit to provide a comparison voltage which is balanced against the voltage across the upper portion of the voltage divider. The complete exciting circuit includes the usual exciter armature 11, brushes 12, series resistor 3, and rotor winding 13. The armature 11 revolves adjacent to a series of field windings 14 indicated by a single coil in the drawing. Winding 14 is connected to a voltage regulator circuit 15, to be described later.

The second relay winding 7b is a holding winding and has one terminal connected to the positive end of the bridge 5. The other terminal is connected in series with an adjustable resistor 10, contacts adjacent to blade 7c, and the negative side of the bridge 5. The contacts adjacent to blade 7d are connected in series with the positive terminal of the bridge 5, voltage regulator circuit 15 and the negative terminal of bridge 5. In addition, a resistor 16 is connected across the contacts adjacent to blade 7d and another resistor 17 is connected across the direct current supply leads for the regulator circuit 15.

The operation of this circuit is as follows: Under normal conditions and when there is no load on the motor shaft, the rotor 2 revolves in synchronism with the alternating current pulses received from a source connected to terminals R, S. When the alternating current is a maximum, the rotor 2 is in a position shown in the drawing, with the rotor poles adjacent to the stator poles. When a normal mechanical load is put on the rotor shaft, the rotor lags several electrical degrees from the position shown but this lag is never more than 20 electrical degrees. It is obvious from the drawing that, in the position shown, the reactance of the rotor-stator combination is a maximum since more iron is in the magnetic path than at any other position.

It is well known that the torque of a synchronous machine is zero when the condition $$\frac{I_e}{I_{eo}}=-\frac{U}{U_n}\left(\frac{X_d}{X_q}-1\right)$$

is fulfilled, wherein $I_e$ denotes the exciting current in any operating condition; $I_{eo}$ is the no-load exciting current; U is the machine applied voltage; $U_n$ is the rated voltage; $X_d$ and $X_q$ are the reactance values when the rotor is aligned as shown in the figure and when at 90 degrees to that position, respectively. Since $I_{eo}$, $U_n$, $X_d$, and $X_q$ are constant quantities, the abovementioned relation may be simplified to:

$$I_e=-CU$$

where $$C=\frac{I_{eo}}{U_n}\left(\frac{X_d}{X_q}-1\right)$$

The above conditions relate to a synchronous motor, without a load, and having the rotor in the position as indicated in FIG. 1. It is obvious that if the rotor be moved 180 degrees from this normal position, the value of $I_e=-CU$ no longer holds.

Figure 3:
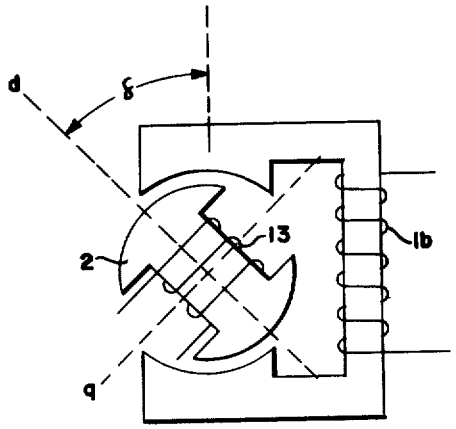
FIG. 3 is a schematic diagram of a synchronous motor with displaced rotor to explain how the circuit operates.

In order to explain the changes which occur when the rotor moves from its normal condition, reference is made to the schematic diagram of FIG. 3. In this figure the position of rotor 2 is given by line d making an angle $\delta$ with line through the center of the pole pieces. An alternating current winding 1b provides the pole pieces with alternating flux and a direct current rotor winding 13 provides the rotor with north and south poles. It is obvious that a maximum permeance exists in the magnetic circuit when $\delta=0$ and a minimum permeance exists when $\delta=90$ degrees. When $\delta=180$ degrees, the alternating current flux produced by the stator pole pieces tends to create a polarity in the rotor which is in opposition to the magnetism produced by the direct current and if the rotor turns in synchronism, presenting the rotor pole pieces alternately to the stator pole pieces there is generated a current in winding 13 which opposes the exciting current and may cause its reversal.

Figure 4:
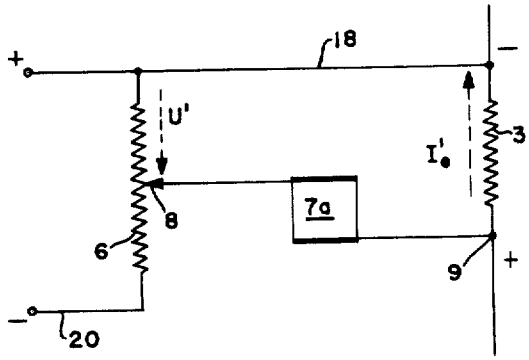
FIG. 4 is a portion of FIG. 1, reproduced to an enlarged scale to aid in the description.

In FIG. 4 is shown the circuit for relay winding 7a. One terminal of the winding is connected to tap 8 on potentiometer 6. The other terminal is connected to terminal 9 at one end of resistor 3 and a conductor 18 joins the upper end of the potentiometer with the other end of resistor 3. It is obvious from the complete wiring diagram shown in FIG. 1, that a direct current potential U' is established between conductor 18 and contact 8 and that this potential is proportional to the line potential existing across terminals R, S. It is also obvious that the potential across resistor 3 is proportional to the direct current furnished by generator 11 for exciting rotor 2. These two potentials are joined by conductor 18 and their sum is applied to winding 7a.

[Under normal conditions the voltage across the potentiometer and the voltage across resistor 3 are in opposition and cancel each other leaving contacts 7c and 7d open. However, when a leading or lagging rotor position influences the exciting current to change its value, the balance of potentials is destroyed, a voltage is applied to winding 7a and contacts 7c and 7d are closed.]

[When contacts 7c are closed (see FIG. 1) current flows from the positive conductor 18, through winding 7b, then through adjustable resistor 10, the contacts closed by blade 7c, and to the negative conductor 20. This circuit holds the two blades in contact for a short time interval and the relay assembly is not normalized until the current in winding 7a is reversed and the opposite magnetic flux from this reversed current neutralizes the flux due to the holding winding and the armature is released.]

[Let it be assumed that rotor 2, owing to some electrical or mechanical disturbance, occupies a position which is displaced by 180 electrical degrees with respect to its normal position, and that the voltages U' and $I'_e$ have the directions given in FIG. 4. This closes the contacts 7d and shorts resistor 16, thereby applying a higher voltage and current to circuit 15.]

*Under normal conditions the voltage U' across the potentiometer and the voltage $I'_e$ across the resistor 3 act in the same sense on winding 7a so that a resultant current flows through the winding. As mentioned above, the relay 7 is polarized and the polarization is such as to prevent the relay being operated by the current flowing as just described, leaving contacts 7c and 7d open. If the rotor is displaced 180° from its correct position $I_e$ now reverses as explained above and the voltage $I'_e$ now acts in opposition to the voltage U' on the winding 7a. If the voltage $I'_e$ is of a value greater than U' it will reverse the current in the winding 7a and cause relay 7 to operate, closing contacts 7c and 7d.*

Voltage regulators are generally designed to provide a stabilized constant voltage at a pair of output terminals when the input voltage varies within a restricted range of values. When this restricted range is exceeded, the output voltage may either rise or fall with respect to a rise in the input voltage. In the present circuit, the input voltage rises to a large value and the output current applied to field coil 14 is sharply reduced, lowering the voltage generated at brushes 12 and, because of the wrong rotor position, the exciting current in resistor 3 reverses and presents a voltage $I'_e$ [(FIG. 4) in the reversed direction] *in the direction opposite to the one shown in FIG. 4.* This excitation current produces a magnetic flux in the rotor which causes the rotor position to slip another 180 electrical degrees and thereby lock into its normal operating condition.

As soon as the current through winding 7a is reversed, the resultant magnetic flux opposes the flux generated by winding 7b and the relay armature is released. Normal voltage and current are now supplied to the regulator 15 and the operation now continues in the same manner as before the disturbance.

Figure 2:
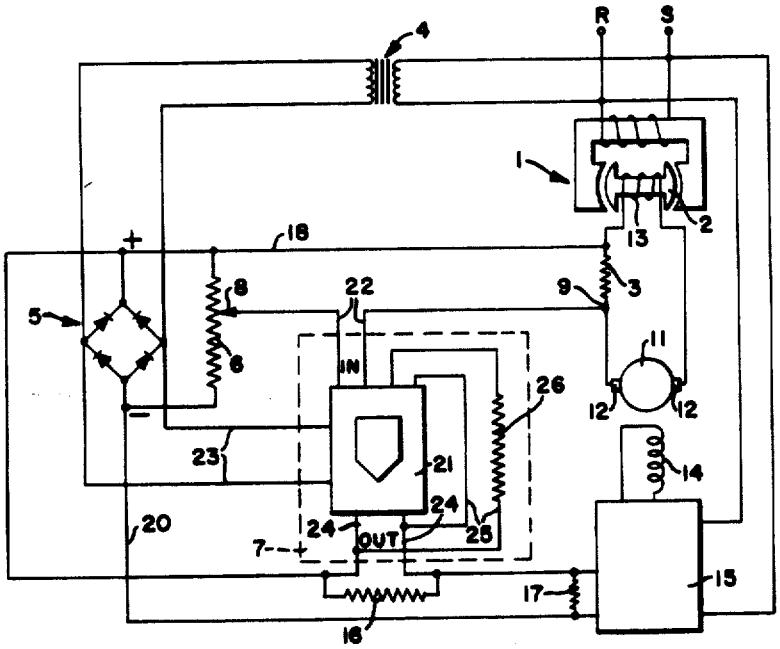
FIG. 2 is a diagram similar to FIG. 1 but showing a feedback amplifier used instead of a relay.

Referring now to the alternate circuit shown in FIG. 2, the circuit is the same except that a feedback amplifier 21 is used instead of a relay. The input leads 22 are connected, as before, to contact 8 and terminal 9. A pair of power conductors 23 are connected between the secondary winding of transformer 4 and the amplifier for rectification, and supply the requirements of the amplifier components. A pair of output conductors 24 are connected to resistor 16 in the same manner as the leads from contacts 7d in FIG. 1.

Amplifier 21 is provided with feedback conductors 25 in series with a limiting resistor 26. The feedback is connected in a positive manner so that the amplifier is either providing no output voltage or a maximum output voltage. When the input leads 22 provide a zero or small voltage, the output is zero. When the input leads are providing a voltage above a critical value, the output conductors add an additional voltage to the input of rectifier 15 to cause the same series of events as described above. The amplifier mode of operation in such that the voltage on input conductors 22 must be reduced by a considerable amount before the circuit resumes its normal "no output" condition.

Figure 5:
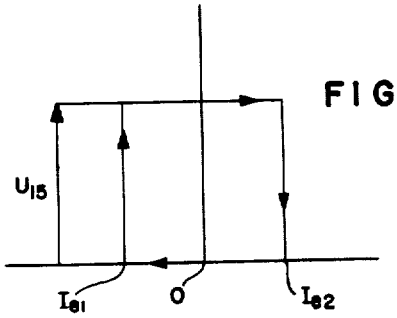
FIG. 5 is a current-voltage graph used to explain the characteristics of the feedback amplifier.

FIG. 5 has been added to give further explanation of the variation of voltages provided by the feedback amplifier circuit. When the exciting current supplied by conductors 22 reaches a critical value, the feedback circuit induces additional input voltage and the output circuit delivers its maximum voltage ($U_{15}$) to the regulator circuit 15. The production of this voltage acts on the input circuit and holds the amplifier in its blocked condition until the exciting voltage, provided by the potentiometer and resistor 3, again has a positive value $I_{e2}$. At this point the output current (due to the amplifier) is reduced to zero.

It will be obvious that the invention provides a fast acting control to maintain the rotor of a synchronous machine in proper relationship with the rotating alternating field.

What I claim as new and desire to secure by Letters Patent is:

1. In a synchronous dynamo machine having a stator, a rotor, an excitation winding, and a corrective circuit for varying the excitation current to correctively rotate the rotor should it lead or lag: apparatus for automatically controlling said corrective circuit comprising (a) a transformer whose primary is connected to the stator terminals, (b) a rectifier bridge whose input terminals are connected to the secondary of said transformer, (c) a potentiometer connected to the output terminals of said rectifier bridge and divided into sections by a movable tap, (d) a resistor in series with said excitation winding and connected across one of the potentiometer sections, and (e) means interposed between said resistor and said potentiometer and responsive both to excitation current and to stator voltage for [breaking] *closing* said corrective circuit whenever $$\frac{I_e}{U}=-\frac{I_{eo}}{U_n}\left(\frac{X_d}{X_q}-1\right)$$

in which:

$I_e$=excitation current
$U$=stator voltage
$I_{eo}$=no-load excitation current
$U_n$=rated voltage
$X_d$=reactance parallel to rotor axis
$X_q$=reactance cross wise to rotor axis 2. Apparatus as defined in claim 1, in which said means (e) comprises a relay and first and second switches actuated thereby, said relay having a first winding interposed between said resistor and potentiometer tap, and a second winding connected across the potentiometer and in series with said first switch, said second switch being in series with said corrective circuit and operating to break said circuit whenever the currents in said relay windings have substantially equal and opposite effects.

3. Apparatus as defined in claim 2, in which a variable resistor is in series with said second winding.

4. Apparatus as defined in claim 1, in which said means (e) comprises a D.C. amplifier having a feedback circuit, the amplifier being connected on its A.C. side to the input terminals of said rectifier bridge, the amplifier input being interposed between said resistor and potentiometer tap, the amplifier output controlling said corrective circuit.

References Cited by the Examiner

The following references, cited by the Examiner, are of record in the patented file of this patent or the original patent.

UNITED STATES PATENTS

| | | | |
|---|---|---|---|
| 2,530,997 | 11/50 | Schaelchlin | 318—167 |
| 2,569,142 | 9/51 | Bellinger | 318—167 X |

ORIS L. RADER, *Primary Examiner.*